United States Patent [19]

Moser

[11] 4,225,176
[45] Sep. 30, 1980

[54] MOTOR VEHICLE, ESPECIALLY AGRICULTURAL MOTOR VEHICLE

[75] Inventor: Gottfried Moser, Bergisch-Gladbach, Fed. Rep. of Germany

[73] Assignee: Klöckner-Humboldt-Deutz Aktiengesellschaft, Cologne, Fed. Rep. of Germany

[21] Appl. No.: 957,304

[22] Filed: Nov. 2, 1978

[30] Foreign Application Priority Data

Dec. 17, 1977 [DE] Fed. Rep. of Germany ....... 2756342

[51] Int. Cl.³ .............................................. B62D 27/00
[52] U.S. Cl. ................................ 296/190; 237/12.3 R
[58] Field of Search ...................... 296/190; 180/89.12, 180/89.13, 89.14, 89.16, 89.19; 237/12.1, 12.3 R

[56] References Cited

U.S. PATENT DOCUMENTS

| 4,088,364 | 5/1978 | Termont | 296/190 |
| 4,120,527 | 10/1978 | Lawrence | 296/190 |
| 4,133,574 | 1/1979 | Martin | 296/190 |

Primary Examiner—John J. Love
Assistant Examiner—John A. Carroll
Attorney, Agent, or Firm—Becker & Becker, Inc.

[57] ABSTRACT

A motor vehicle, especially agricultural motor vehicle, which comprises a driver's cab with lateral parts formed by lateral walls of fenders which lateral walls are adapted to transmit overturning forces conveyed to an overturning protective device associated with the driver's cab, and/or to transmit overturning forces received by the driver's cab to the frame of the vehicle and/or to an axial carrier of a driving axle, while the side walls of the fenders are bridged by an upwardly directed transverse wall reinforcing these side walls and preceded by a seat for the driver. The transverse wall, at least within the region of the driver's seat, is designed as honeycomb-shaped structural member while at least one member of this honeycomb-shaped member serves for receiving and storing a working medium for a fluid operable system in the motor vehicle.

6 Claims, 4 Drawing Figures

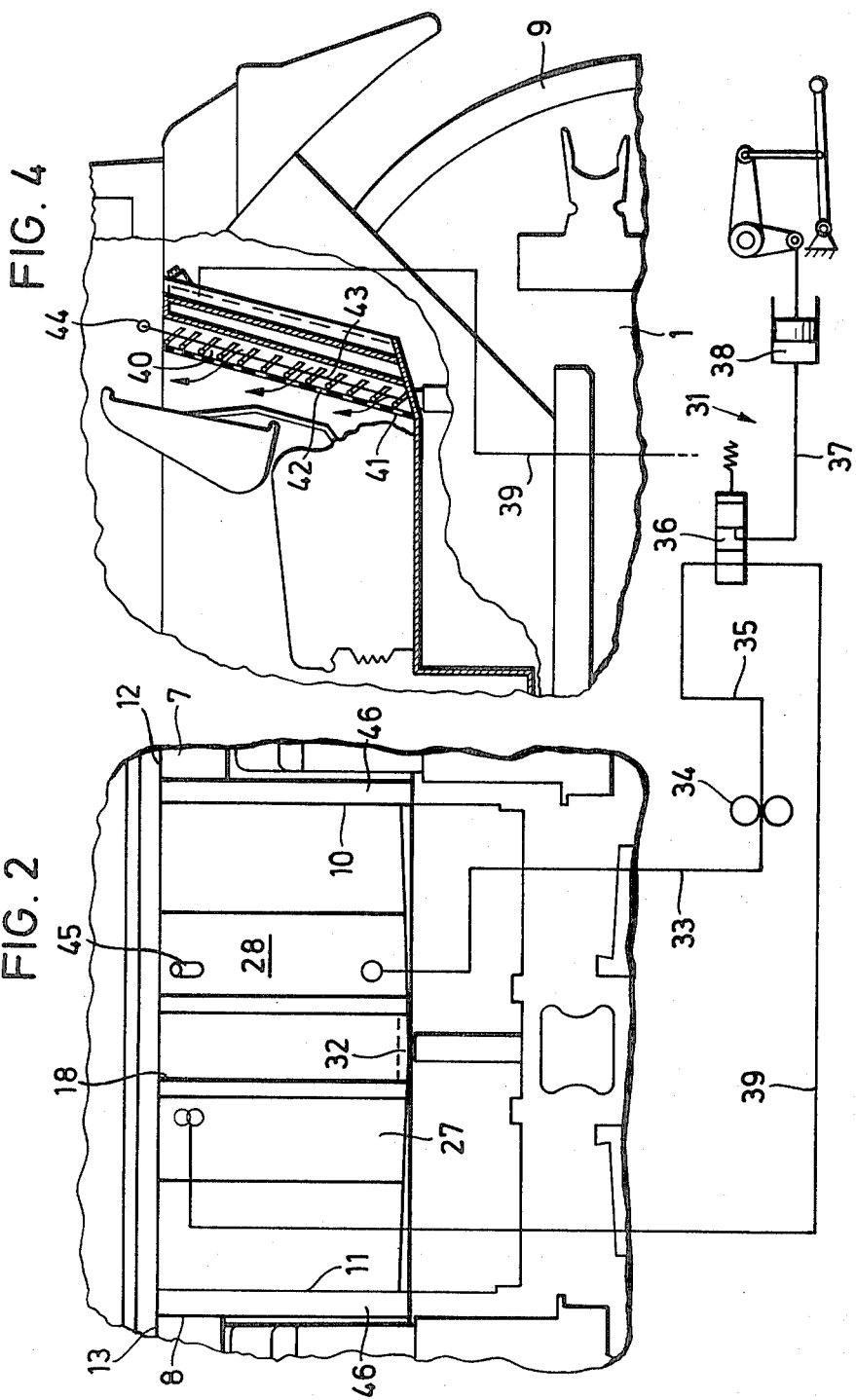

MOTOR VEHICLE, ESPECIALLY AGRICULTURAL MOTOR VEHICLE

The present invention relates to a storage container for a working medium, especially for the working medium of a hydraulic plant of a vehicle usable especially for agriculture. The driver's cab is provided with lateral parts which are formed by the side walls of fenders which serve to convey the turnover forces received from a turnover protective device associated with the driver's cab or received by a driver's cab, into the frame of a vehicle and/or in one of the axle carriers of a driving axle, while the side walls of the fenders are bridged by an upwardly directed transverse wall for reinforcing said side walls, said transverse wall being preceded by a driver's seat.

With a storage container of the above mentioned type, there exists the problem to mount the same in a space-saving manner on or in the driver's cab in such a way that the storage container in case the vehicle overturns, will not undergo any non-permissible deformation. Parallel thereto there exists the problem so to hold a storage container that with the maximum rigidity it will permit a maximum cooling for the working medium, and in case of need can be used as heating element for the driver's cab.

Based on these findings, it is an object of the present invention to provide a storage container of the above mentioned type which with a cost-saving and compact structure will permit a multi-use in such a way that the survival space surrounding the driver in seating position is directly secured by the container in such a way that even with increased forces obtained from the side parts of the fenders, no buckling of the transverse wall within the region of the driver's cab will result. At the same time, there should exist the possibility to employ the storage container in case of need as heating element and/or as sound insulator.

These and other objects and advantages of the invention will appear more clearly from the following specification in connection with the accompanying drawings, in which:

FIG. 1 diagrammatically illustrates a cross section of the storage container with an associated hydraulic plant.

FIG. 2 is a rear view of the storage container of FIG. 1.

FIG. 4 is a cross section of the storage container according to the invention with preceding guiding passages for hot air which can be turned on and off.

Figure 1:
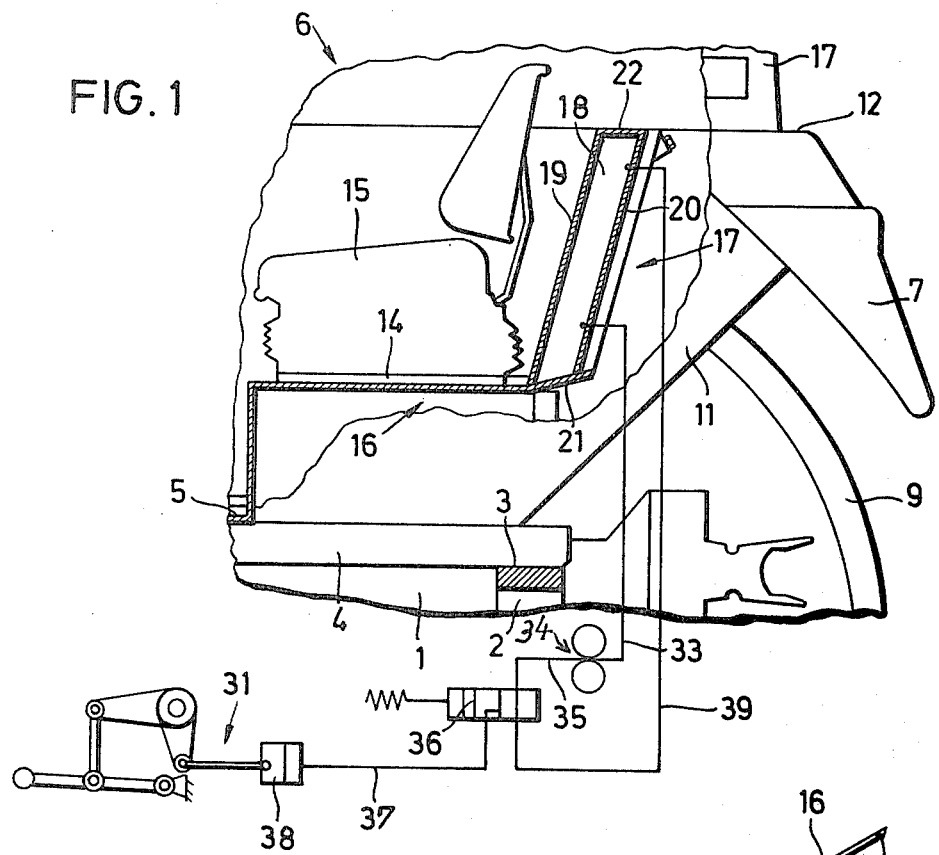

The storage container according to the invention is characterized primarily in that the transverse wall, at least within the region of the driver's cab forms a honeycomb shaped structural member, and that one or more chambers of the honeycomb structural member serve for receiving the working medium. Such a solution will in addition to permitting a light structure and simple construction bring about the important advantage that it is suitable for storing the hydraulic working medium of a power operable hoist and of an additional hydraulic steering unit. This is due to the fact that now the working medium can be stored in such a way that it is subjected to only a slight oxygen influence in view of the reduced surface of the liquid level. The solution according to the invention therefore is particularly suitable for the storing of a thermally highly stressed hydraulic working medium. Moreover, this solution brings about the advantage that in case of an overturn of the vehicle, the forces conveyed from the fenders into the transverse wall are so absorbed by the working medium container that the latter is subjected to forces only within the framework of the admissible elastic deformations.

According to a further development of the invention, it is provided that the honeycomb structural member is connected to the side walls of the fenders by means of intermediate plates which are provided with a less longitudinal stiffness than said honeycomb shaped structural member. Such a solution particularly results in the advantage that the intermediate plates provided between the honeycomb shaped structural member and the fenders can be used as elastic intermediate members so that in the case of a turnover, forces introduced by the side plates will not have to be absorbed in such a shock-like manner by the honeycomb shaped structural member.

If the hydraulic plant of the vehicle has a preferred hydraulic consumer for instance a hydraulic steering device and one or more non-preferred consumers, it is suitable for surely supplying the preferred consumer with the working medium, to see to it that the web-shaped structural member has a preferred first chamber associated with the consumer and a second chamber associated with the non-preferred consumer, while said second chamber has an overflow leading into the first chamber.

For a multiple use of the transverse wall within the region of the driver's seat, it is according to the present invention also provided that the honeycomb shaped structural member has a number of chambers of which one or more serve as storage container and that a chamber adjacent thereto serves as guiding passage for the cooling air surrounding the storage container.

For purposes of providing a particularly simple heating plant for the driver's cab, it is suggested according to the present invention that the honeycomb shaped structural member is preceded in the direction of the driver's seat and/or has guiding passages for the introduction of air heated by the working medium, into the driver's cab. These guiding passages are located laterally of the honeycomb structural member and are adapted to be turned on and off. In connection therewith, it is expedient that the elements which control the supply of heated air into the driver's cab are mounted and/or are guided on a second honeycomb-shaped structural member which is connected with the first mentioned honeycomb-shaped member.

Figure 3:
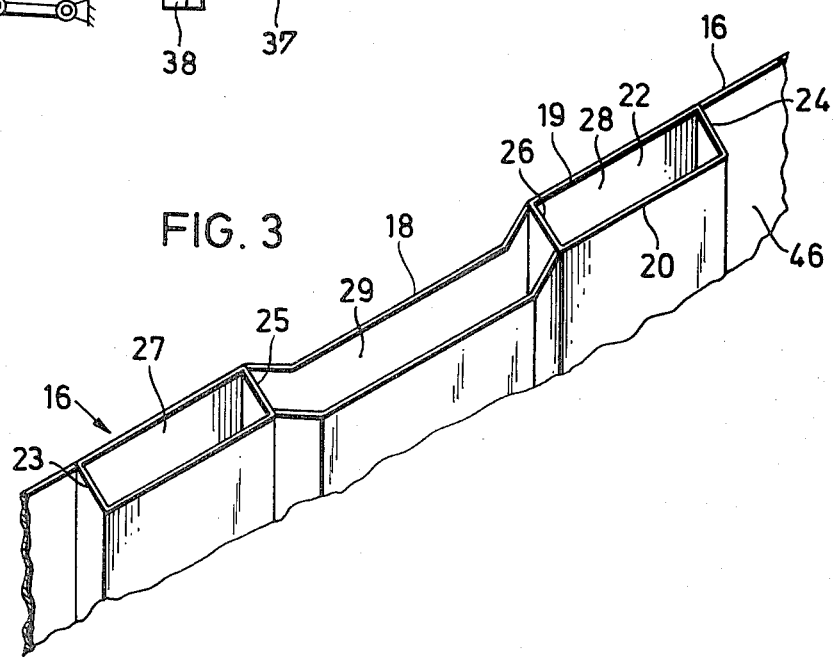
FIG. 3 is a top view of the storage container of FIGS. 1 and 2.

Referring now to the drawings in detail, according to the embodiment shown in FIGS. 1–3, a bottom plate 5 of a driver's cab 6, which bottom plate is provided with a base frame 4, rests on a chassis (not illustrated) of a tractor on a plurality of bearing blocks 2 (not fully illustrated) through the intervention of elastic bearings 3 respectively associated therewith. On both sides, the driver's cab 6 is confined by a right hand fender 7 and a left hand fender 8, which are respectively associated with driving wheels 9. The fenders 7 and 8 are respectively provided with a lateral member 10, 11 having associated therewith a horizontal part 12, 13 respectively covering the driving wheel 9. With regard to each other, the lateral parts 10, 11 are past and below the bearing 14 of a driver's seat 15 bridged by a transverse wall 16 which is one or more times angled off.

The fenders 7 and 8 serve as support for rear posts 17 of a non-illustrated upper section of a driver's cab, said post 17 being braced with the horizontal parts 12, 13 of said fenders. For protecting the space occupied by the driver's seat 15, that part of the transverse wall 16 which extends over the height of the driver's seat 15 is designed as a honeycomb-shaped structural member 18. The member 18 is formed by an upwardly directed wall 19 and a wall 20 which is arranged in spaced relationship and parallel to said wall 19 while being provided with angled-off parts 23, 24. Laterally, the honeycomb-shaped structural member 18 is connected to the lateral parts 10, 11 through the intervention of intermediate plates 46 which have a less longitudinal stiffness than said structural member 18. The two walls 19, 20 of the structural member 18 are closed at the bottom section by a bottom 21 and at the top section by a cover 22. For further stiffening the honeycomb shaped structural member 18, the latter is between the angled-off part 23, 24 provided with a partition 25 and 26. That portion of the walls 19, 20 which is enclosed by the two partitions 25, 26 is designed as a honeycomb 29 offset in a parallel direction with regard to the lateral honeycombs 27, 28. The lateral ends of said honeycombs 27, 28 are connected to the partitions 25 and 26 respectively by an angled-off leg 30.

The honeycomb 27 together with the honeycomb 28 forms the storage container for the working medium of a hydraulic power lift 31. The two honeycombs 27, 28 are interconnected by means of a tubular bridge 32 (Übertritt) within the region of the bottom 21. In the vicinity of the bottom 21, that portion of the storage container which is formed by the honeycomb 28 is through a suction line 33 connected to a pressure medium pump 34 which through a pressure conduit 35 communicates with a control member 36. The control member 36 is operatively connected to the power lift 31 through non-illustrated linkage members and depending on the introduced control pulse controls the working medium which is fed through a pressure line 35 and through a conduit 37 conveys it to the working cylinder 38 or in a neutral position controls the working medium to flow toward a return line 39 which communicates with the honeycomb 27. In this connection, the working medium heated up by the build-up of pressure is under normal conditions cooled by air flowing from below through the honeycomb 29. To this end, the upper cross section of the honeycomb 29 is not closed by the cover 22. However, there exists the advantageous possibility of closing the bottom side of honeycomb 29 and the top by a cover and of passing a cooling medium for instance the cooling medium of the internal combustion engine of the drive of the tractor through the enclosed space. This will in particular assure a predetermined maximum and minimum temperature of operation of the working medium of the power lift. For filling the working medium into the honeycombs 27, 28, the latter is provided with a filling connection 45.

In a similar manner, there exists the possibility, when employing both honeycombs 27, 28 as storage containers for a hydraulic insulation, with a preferred consumer such as the control cylinder of a steering device and a power lift supplied by a separate pump, to connect the two suction lines to the honeycombs 27, 28 which are offset as to their height so that by the bridge 32 there will always be assured that the preferred consumer is over the non-preferred consumer supplied with a working medium from one of the two honeycombs 27, 28.

According to the embodiment illustrated in FIG. 4, in contrast to the embodiment illustrated in FIGS. 1–3, the honeycombs 27, 28, 29 have associated therewith a further honeycomb 40 with a wall 41 which is parallel to the wall 19, said wall 41 being provided with a plurality of passages 42. Louvered or shutter-like plates 43 which are arranged on the wall 41 are by means of a rod 44 pivotable about turning points on the wall 41. In this connection, the honeycombs 40 are through non-illustrated passages connected to the honeycomb 29 which is open at both sides. Through these passages, the incoming air can laterally pass into the honeycombs 40 and after being heated up will, depending on the adjustment of the louvers or shutters 43 be heated by the working medium in the honeycombs 27, 28 and will flow into the driver's cab 6.

It is, of course, to be understood, that the present invention is, by no means, limited to the specific showing in the drawings, but also comprises any modifications within the scope of the appended claims.

What I claim is:

1. A motor vehicle, especially agricultural motor vehicle comprising a driver's cab including a driver's seat and also comprising lateral parts formed by lateral walls of fenders, said lateral parts being provided for transmitting forces exerted upon the driver's cab to other parts of the vehicle in the event the vehicle upsets or turns over, in which said lateral walls of said fenders are bridged by a transverse wall reinforcing the latter and located adjacent said driver's seat, said transverse wall at least within the region of said driver's seat being designed as a honeycomb-shaped structural member having at least one chamber for receiving and storing a fluid medium for a fluid operable system, and intermediate plates connecting said honeycomb-shaped structural member with said side walls of said fenders, said intermediate plates having a lower longitudinal stiffness than said honeycomb-shaped structural member.

2. A motor vehicle especially agricultural motor vehicle comprising a driver's cab including a driver's seat and also comprising lateral parts formed by lateral walls of fenders, said lateral parts being provided for transmitting forces exerted upon the driver's cab to other parts of the vehicle in the event the vehicle upsets or turns over, in which said lateral walls of said fenders are bridged by a transverse wall reinforcing the latter and located adjacent said driver's seat, said transverse wall at least within the region of said driver's seat being designed as a honeycomb-shaped structural member having at least one chamber for receiving and storing a fluid medium for a fluid operable system, said honeycomb-shaped structural member comprising a first chamber for connection with a preferred fluid consumer and also comprising a second chamber for connection with a secondary fluid consumer, said secondary chamber comprising an overflow leading into said first chamber.

3. A motor vehicle especially agricultural motor vehicle comprising a driver's cab including a driver's seat and also comprising lateral parts formed by lateral walls of fenders, said lateral parts being provided for transmitting forces exerted upon the driver's cab to other parts of the vehicle in the event the vehicle upsets or turns over, in which said lateral walls of said fenders are bridged by a transverse wall reinforcing the latter and located adjacent said driver's seat, said transverse wall at least within the region of said driver's seat being designed as a honeycomb-shaped structural member having at least one chamber for receiving and storing a fluid medium for a fluid operable system, said honeycomb-shaped structural member having at least one storage chamber for receiving and storing a hydraulic medium, and has at least one other chamber serving as guiding passage for conveying cooling air around said at least one storage chamber.

4. A motor vehicle especially agricultural motor vehicle comprising a driver's cab including a driver's seat and also comprising lateral parts formed by lateral walls of fenders, said lateral parts being provided for transmitting forces exerted upon the driver's cab to other parts of the vehicle in the event the vehicle upsets or turns over, in which said lateral walls of said fenders are bridged by a transverse wall reinforcing the latter and located adjacent said driver's seat, said transverse wall at least within the region of said driver's seat being designed as a honeycomb-shaped structural member having at least one chamber for receiving and storing a fluid medium for a fluid operable system, and guiding passages adapted to be turned on and off for conveying into said cab air heated up by a working fluid, said guiding passages preceding said cab when looking in the direction toward said cab.

5. A motor vehicle especially agricultural motor vehicle comprising a driver's cab including a driver's seat and also comprising lateral parts formed by lateral walls of fenders, said lateral parts being provided for transmitting forces exerted upon the driver's cab to other parts of the vehicle in the event the vehicle upsets or turns over, in which said lateral walls of said fenders are bridged by a transverse wall reinforcing the latter and located adjacent said driver's seat, said transverse wall at least within the region of said driver's seat being designed as a honeycomb-shaped structural member having at least one chamber for receiving and storing a fluid medium for a fluid operable system, and guiding passages adapted to be turned on and off for conveying into said cab air heated up by a working fluid, said guiding passages being arranged laterally of said honeycomb-shaped structural member.

6. A motor vehicle especially agricultural motor vehicle comprising a driver's cab including a driver's seat and also comprising lateral parts formed by lateral walls of fenders, said lateral parts being provided for transmitting forces exerted upon the driver's cab to other parts of the vehicle in the event the vehicle upsets or turns over, in which said lateral walls of said fenders are bridged by a transverse wall reinforcing the latter and located adjacent said driver's seat, said transverse wall at least within the region of said driver's seat being designed as a honeycomb-shaped structural member having at least one chamber for receiving and storing a fluid medium for a fluid operable system, an additional honeycomb-shaped structural member connected to said first mentioned honeycomb-shaped structural member, and control means associated with said additional honeycomb-shaped structural member for controlling the supply of heated-up air to said driver's cab.

* * * * *